US00H002206H

(19) United States
(12) Statutory Invention Registration
Milgram

(10) Reg. No.: US H2206 H
(43) Published: Dec. 4, 2007

(54) TACTILE SIDE-SLIP CORRECTIVE YAW CONTROL FOR AIRCRAFT

(75) Inventor: Judah H. Milgram, Hyattsville, MD (US)

(73) Assignee: The United States of America as represented by the Secretary of the Navy, Washington, DC (US)

(21) Appl. No.: 10/975,112

(22) Filed: Oct. 28, 2004

(51) Int. Cl.
*B64C 13/24* (2006.01)

(52) U.S. Cl. ..... 244/75.1; 244/76 R; 244/194; 244/195; 244/196

(58) Field of Classification Search ..... 244/75 R, 244/76 R, 194–195, 223, 185; 340/945–980, 340/965; 701/14
See application file for complete search history.

(56) References Cited

U.S. PATENT DOCUMENTS

| | | | | | |
|---|---|---|---|---|---|
| 2,008,693 | A | * | 7/1935 | Fator | 340/965 |
| 2,442,289 | A | | 5/1948 | Garehime | |
| 2,697,566 | A | | 12/1954 | Glass | |
| 3,076,624 | A | | 2/1963 | Lewis | |
| 3,792,426 | A | * | 2/1974 | Ravenelle et al. | 340/965 |
| 3,902,687 | A | * | 9/1975 | Hightower | 244/185 |
| 4,195,802 | A | | 4/1980 | Gilson et al. | |
| 4,206,891 | A | | 6/1980 | Perez et al. | |
| 4,484,191 | A | * | 11/1984 | Vavra | 340/965 |
| 4,814,764 | A | * | 3/1989 | Middleton | 340/967 |
| 5,062,594 | A | | 11/1991 | Repperger | |
| 5,467,322 | A | | 11/1995 | Walter | |
| 5,738,310 | A | | 4/1998 | Rollet et al. | |
| 5,852,237 | A | * | 12/1998 | Renshaw | 73/180 |
| 6,002,349 | A | * | 12/1999 | Greene et al. | 340/965 |
| 6,253,126 | B1 | * | 6/2001 | Palmer | 701/14 |
| 6,273,371 | B1 | * | 8/2001 | Testi | 244/223 |

OTHER PUBLICATIONS

Craig, G., Jennings, S., Cheung, B, Rupert, A., Schultz, K., "Flight–Test fo a Tactile Situational Awardness System in a high–Hover Task", American Helicopter Soc. 60th Annual Forum, Baltimore, Maryland, June 7–10, 2004, 7 pages.

* cited by examiner

*Primary Examiner*—Dan Pihulic
(74) *Attorney, Agent, or Firm*—Jacob Shuster

(57) ABSTRACT

Side-slip of an aircraft during flight is detected through a pair of pressure sensors fixedly mounted on opposite lateral sides of the aircraft fuselage. Pressure measurement signals at said sensors are fed to electronic circuitry within the aircraft for generating magnitude and frequency signals reflective of the side-slip that are applied to a pair of vibrators respectively mounted on the undersides of a pair of pilot foot pedals located within the cockpit. The foot pedals are connected by linkage to the tail rudder on the aircraft fuselage. The varying magnitude and frequency of vibrations applied to the rudder foot pedals by the vibrators enables the pilot to immediately sense side-slip through the feet on the pedals. In response to such side-slip sensing, one of the pedals may be timely depressed for side-slip corrective angular displacement of the rudder.

9 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TACTILE SIDE-SLIP CORRECTIVE YAW CONTROL FOR AIRCRAFT

STATEMENT OF GOVERNMENT INTEREST

The invention described herein may be manufactured and used by or for the Government of the United States of America for governmental purposes without the payment of any royalties thereon or therefore.

The present invention relates to aircraft control for side-slip corrective purposes.

BACKGROUND OF THE INVENTION

Traditionally, aircraft are maneuvered by pitch and yaw control inputs applied in a coordinated manner for smooth directional maneuvering of the aircraft. During such maneuvering of the aircraft, the desired pilot coordinated control over a rudder maintains alignment between the fuselage longitudinal yaw axis and the oncoming flow of air during flight of the aircraft under a zero side-slip condition so as to (a) minimize drag, (b) reduce risk of inadvertent spin under low speed flight, and (c) provide for aircraft passenger comfort. In certain rotary-wing types of aircraft small residual side-slip is desired to counteract lateral load due to the tail rotor by pilot application of a sufficient degree of foot pedal depression. Various automatic maneuvering control systems have however been proposed for establishing the aforesaid desirable coordinated maneuvering control, because of the pilot's inability to continuously provide it manually. Various disadvantages have however been inherently associated with such automatic control systems. It is therefore an important object of the present invention to augment direct pilot maneuvering control by providing immediate tactile perception to the pilot so as to enable corrective response to aircraft side-slip due to non-alignment between the airflow flight path and the yaw axis and thereby avoid any substantial deviation from zero side-slip condition.

SUMMARY OF THE INVENTION

Pursuant to the present invention, an aircraft is provided with means for measuring the aircraft side-slip angle. Such side-slip measurements are utilized to generate signals with magnitude and frequency corresponding to side-slip, applied to tactile vibrators mounted on the underside of a pair of pilot foot controls providing the pilot with sense touch perception of any side-slipping condition, thereby enabling immediate pilot depression of the foot controls for corrective control over the aircraft relative to the yaw axis so as to minimize the perceived side-slip. The pilot may thereby provide such corrective control without visual reference to cockpit instruments.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF THE PREFERRED EMBODIMENT

Figure 1:
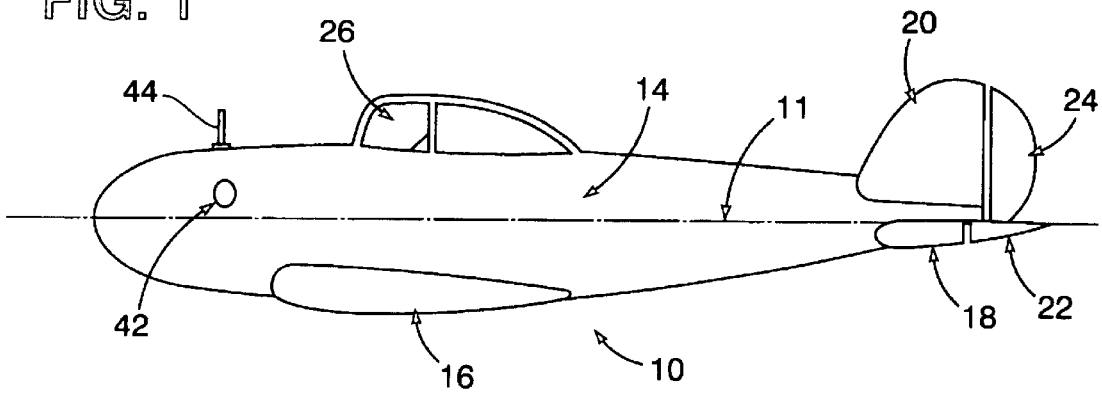
FIG. 1 is a side elevation view of an aircraft under flight, with side-slip corrective maneuvering facilities pursuant to the present invention.

Referring now to the drawing in detail, FIG. 1 illustrates a typical aircraft 10 during flight having a longitudinal yaw axis 11. The aircraft 10, which may be of a glider type, has a fuselage 14 with wings 16 attached thereto as well as horizontal and vertical stabilizers 18 and 20 at the tail end thereof. Pivotally connected to the horizontal stabilizers 18 are elevators 22, while a rudder 24 is pivotally connected the vertical stabilizer 20.

Maneuvering of the aircraft 10 as generally known in the art involves displacement of the elevators 22, the rudder 24 and ailerons under control of the pilot in the aircraft fuselage cockpit 26.

Figure 2:
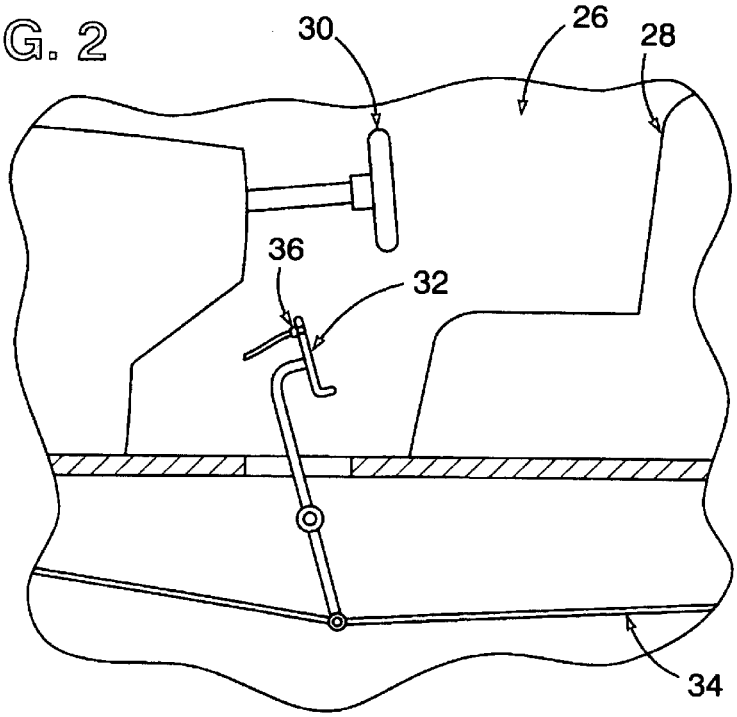
FIG. 2 is a partial fragmentary view of a cockpit portion of the aircraft shown in FIG. 1.
Figure 3:
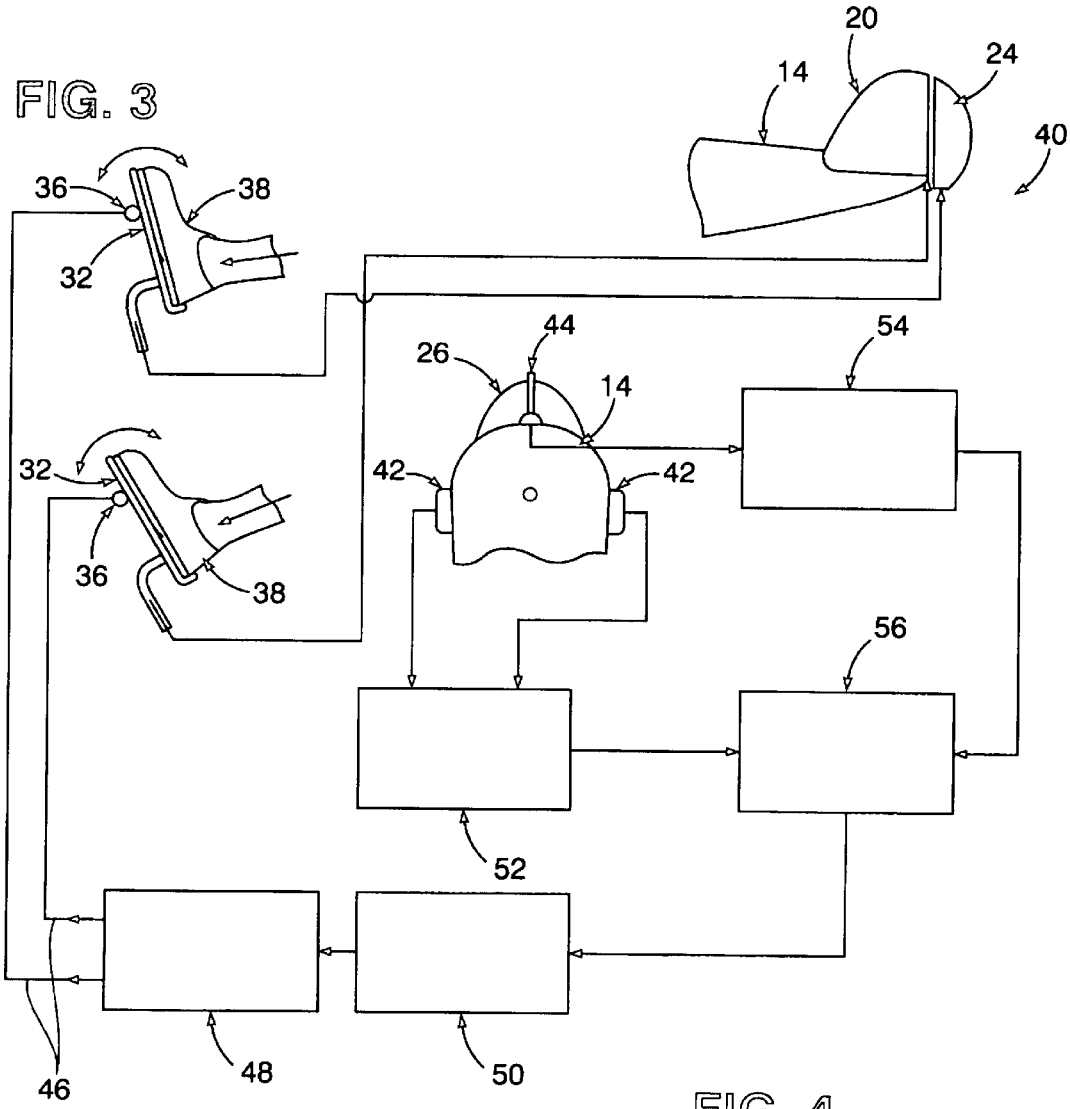
FIG. 3 is a schematic circuit diagram of the tactile side-slip corrective rudder control system associated with the aircraft as shown in FIGS. 1 and 2.

As shown in FIG. 2, pilot control is exercised by a pilot when seated on a seat 28 within the cockpit 26 to thereby manually manipulate control yoke 30 and depress a pair of rudder foot control pedals 32 operatively connected by linkages 34 to the rudder 24. Pursuant to the present invention, electromechanical vibrators 36 are mounted on the underside of the petals 32 so as to provide tactile or sense of touch signals applied to the pilot feet 38 positioned on the pedals 32 as depicted in FIG. 3, for yaw axis maneuvering control through the rudder 24 on the tail end of the aircraft fuselage 14. Generation of the pilot foot signals by the vibrators 36 applied to the pilot feet 38 is under control of a system 40 as diagrammed in FIG. 3, which includes a pair of static pressure detectors 42 mounted on opposite port and starboard sides of the fuselage 14.

With continued reference to FIG. 3, the rudder pedal vibrators 36 are connected by electric power cables 46 of the system 40 to a controller 48 which is connected to a side-slip yaw sensor 50 for reception of side-slip air pressure sensing signals received from the side-slip detectors 42. The side-slip detection signals from the detectors 42 is directly fed to a differential transducer 52. The output from the transducer 52 and a transducer 54 is fed to a calibrating control 56 from which supply of calibrated side-slip detection signals are fed to the side-slip sensor 50.

Based on the foregoing description, the controller 48 uses the side-slip signal from the sensor 50 to operate a selected one of the two vibrators 36 so as to signify to the pilot by vibration applied to one of the pilot feet 38 which of the rudder pedals 32 is to be depressed so as to effect angular displacement of the rudder 24 in one direction for side-slip error corrective purposes. The controller 48 may embody a dead band operational feature to by-pass selected pedal vibrator operation when the side-slip error is too small for correction. Furthermore, the controller 48 may incorporate a pilot actuated resetting switch and associated resetting circuit for varying the vibrating pressure applied to the rudder pedals 32 by the vibrators 36 so as accommodate different pilot sensibility preferences. The controller 48 may accordingly be selectively set to generate signals applied to the vibrators 36 by measurements of side-slip to be corrected by precise pilot yaw control through the rudder pedals 32. The signal correction proportionality measurement parameters of the controller 48 may be tuned to side-angle deviation, vibration frequency and vibration magnitude of the vibrators 36. Control over the rudder pedal vibrators 36 through the controller 48 may also be utilized for signifying the requirement of corrective pedal foot input to avoid forthcoming dangerous flight conditions alerted to the pilot.

It will be apparent from the foregoing description that in addition to controlled maneuvering of the aircraft 10 during flight through the steering wheel 30, the pedals 32, the horizontal stabilizer elevators 22 and the rudder 24, as generally known in the art, side-slip corrective adjustment control may be applied to the rudder 24 by the pilot through the pedals 32 in response to tactile sensing of vibrations applied thereto by the vibrators 36. Such vibrations vary in magnitude and frequency in accordance with the detection of aircraft side-slip through the side-slip detector ports 42 and a side-slip indicating vane 44.

Figure 4:
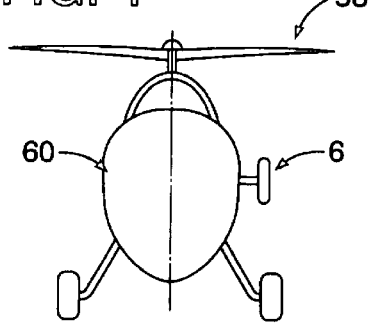
FIG. 4 is a front elevation view of a helicopter type aircraft with a lateral accelerometer pursuant to another embodiment of the present invention.

FIG. 4 illustrates an asymmetric type of aircraft such as a helicopter 58, which is to be maneuvered during flight with zero lateral acceleration pursuant to another embodiment of the present invention. Laterally mounted on the fuselage 60 of the aircraft 58 is an accelerometer sensor 62 for detecting any lateral side-slip movement of the aircraft 58 which is to be eliminated under a pilot control system involving a control box switchable between zero side-slip mode and ball in the middle mode. Such maneuvering control system associated with the asymmetrical helicopter aircraft 58 may also be applicable to a symmetrical type of aircraft.

Obviously, other modifications and variations of the present invention may be possible in light of the foregoing teachings. It is therefore to be understood that within the scope of the appended claims the invention may be practiced otherwise than as specifically described.

What is claimed is:

1. In combination with an aircraft having a pilot cockpit mounting therein foot-operated means for directional aircraft control about a longitudinal yaw axis by a pilot seated within the cockpit; tactile means for providing pilot perception of side-slip condition, comprising: sensing means for detection of any aircraft side-slip reflected by angular deviation of air flight direction from the longitudinal yaw axis; vibrator means for selectively imparting vibrations directly to the foot-operated means in response to said detection of the side-slip; and signal generating means operatively interconnected between the sensing means and the vibrator means supplying side-slip indicating signals for said perception of the side-slip condition by the pilot through the foot-operated means.

2. The combination as defined in claim 1, wherein said foot-operated means within the cockpit are pilot pedals.

3. The combination as defined in claim 1, wherein said vibrator means comprises: a pair of vibration devices mechanically connected to said foot-operated means.

4. The combination as defined in claim 1, wherein said sensing means comprises: measurement means for measuring alignment of airflow relative to the aircraft longitudinal yaw axis.

5. The combination as defined in claim 4, wherein said measurement means comprises: a pair of static pressure sensing devices fixedly mounted on opposite sides of the aircraft.

6. The combination as defined in claim 1 wherein said sensing means comprises: sensor means fixedly mounted on the aircraft for sensing lateral acceleration thereof.

7. The combination as defined in claim 1 wherein said signal generating means comprises: computational means for computing control inputs based on a mathematical model of aircraft flight mechanics.

8. The combination as defined in claim 1 wherein said signal generating means provides a signal proportional to the side-slip; and modulator means for proportionally modulating the vibrator means to render the vibrations proportional to the side-slip.

9. The combination as defined in claim 1 wherein said sensing means comprises: sensor means for sensing aircraft lateral acceleration; and measurement means for measuring aircraft misalignment of airflow; said signal-generating means being selectably configured either to lateral acceleration of the aircraft or the detection of the side slip.

* * * * *